United States Patent Office 3,025,245
Patented Mar. 13, 1962

3,025,245
CATALYST PREPARATION
Gordon D. Brindell and Allan J. Lundeen, Ponca City, Okla., assignors to Continental Oil Company, Ponca City, Okla., a corporation of Delaware
No Drawing. Filed June 30, 1958, Ser. No. 745,287
7 Claims. (Cl. 252—429)

This invention relates to the production of a catalyst suitable for use in the polymerization of unsaturated hydrocarbons such as alpha olefins, diolefins, and acetylenes. Still more particularly, the present invention describes the preparation of a new catalyst useful in the production of essentially isotactic polypropylene.

Heretofore a rather large number of catalysts have been proposed for use in the polymerization of the unsaturated hydrocarbons listed above. In general these polymerization catalysts contain a transition metal halide used in conjunction with a reducing agent. Suitable transition metals include such metals as titanium, chromium, vanadium, tungsten, and others. Of these metals titanium is the one most generally used and preferred. In the final state the polymerization catalysts as a rule contain these metals in a valence lower than their maximum and are obtained by reactions which may be considered at least in part as reduction reactions. It has been stated that in principle the selection of the reducing agents to convert the metal compounds of the catalyst is not important. It is stated further that these reducing agents may be alloys, or metal hydrides of the first, second and third groups of the periodic system. It has also been pointed out that ethylene may be converted to a solid polymer employing very high pressure and in the presence of a catalyst. By catalyst is meant a material which is capable of yielding free radicals under the polymerization conditions employed. Somewhat more recently it has been discovered that novel polymerization catalysts consisting of a reduced titanium metal complex may be used in the production of such polymers. This titanium complex is formed by reducing a titanium salt or ester, wherein the titanium has a valence of four to below three, and then combining the reduced product with the unsaturated hydrocarbon to be polymerized. The reduction of the titanium from the tetra or trivalent state is accomplished by the use of strong reducing agents such as a metallo-organic compound or a metal hydride of a metal such as zinc or other metal above zinc in the electromotive series. Metals in the electromotive series above zinc such as the alkali metals are capable of reducing titanium from a valent state above three to a valent state of below three.

Natta in "Chemistry and Industry," 1525 (1957), makes the statement that stereospecific polymerization does not result when alkyls of metals of large ionic dimensions (specifically sodium) are used as a catalyst component. As a result the catalysts prepared by the procedures disclosed in the prior art are generally confined to the use of titanium trichloride or titanium tetrachloride as one component plus the use of an aluminum trialkyl or similar compound as the second component. As used herein, by similar compound is meant a material such as aluminum dialkyl halide, aluminum diisobutyl halide, and other similar organic compounds containing aluminum. It has been also pointed out in the prior art that the activity of a catalyst prepared from titanium trichloride or titanium dichloride is initially inferior to catalysts prepared from titanium tetrachloride; furthermore, although a catalyst prepared from titanium tetrachloride is initially very active, the activity of such a catalyst decreases rapidly with time. Conversely, catalysts prepared from titanium trichloride or titanium dichloride remain relatively active over long periods of time. That is, the activity of such catalysts do not exhibit any marked, decreased activity with time.

It is therefore a primary object for the present invention to provide a catalyst which is suitable for use in the polymerization of unsaturated hydrocarbons that obviates the difficulties and disadvantages encountered in the use and preparation of catalysts described in the prior art. It is another object of our invention to provide a method of increasing the activity of catalysts prepared using titanium trichloride and an alkali metal alkyl as the reducing agent. It is yet another object of our invention to provide a catalyst that will retain its activity over long periods of time. Further objects and advantages of the present invention will be apparent as the invention is further disclosed.

To the accomplishment of the foregoing and related ends, this invention comprises the features hereinafter fully described and particularly pointed out in the claims, the following description setting forth in detail certain illustrative embodiments of the invention. These are indicative however of but a few of the various ways in which the principle of the invention may be employed.

Briefly described, the catalyst of this invention may be prepared by dispersing sodium or potassium and a solid crystalline transition metal chloride, specifically titanium trichloride, in a liquid alkane and then adding to the resulting dispersion a solution comprising a chlorine substituted hydrocarbon and a liquid alkane followed by heating the resulting mixture to between 20 and 70° C. for a period of time which may vary from ½ to 3 hours. During the entire reaction it is necessary that the reaction mixture be maintained under anhydrous conditions and also that oxygen be excluded therefrom. Oxygen is excluded by carrying out the reaction under an atmosphere of an inert gas. Although we prefer to operate in the absence of oxygen, the use of trace amounts of oxygen in the system is not precluded. In some cases small amounts of oxygen present in the system may impart beneficial results to the polymerization reaction.

Before describing the invention in detail, it may be well to disclose the types and quantities of materials suitable for use in the process.

Suitable transition metal chlorides are those that are solid and crystalline. Although any of the transition metal chlorides as listed above which fulfill the foregoing requirements may be used, we prefer titanium trichloride.

Suitable chlorine substituted hydrocarbons include both alkyl and aryl chlorine substituted hydrocarbons with the requirement that the carbon content of the hydrocarbon radical varies from 3 to 20. As a rule, however, we prefer to employ a chlorine substituted hydrocarbon that contains from 4 to 10 carbon atoms. Suitable solvents are those which are, under standard conditions, a liquid. Obviously the entire reaction must be carried out under anhydrous conditions as any water present would immediately react with the sodium or potassium.

As another criterion, at least excessive quantities of oxygen must be absent. Generally, we prefer to operate the process under conditions where all oxygen would be excluded such as operating under an atmosphere of an inert gas. As pointed out above, however, our preferred method of operating under an atmosphere of an inert gas does not exclude trace amounts of oxygen. In some cases, the presence of trace amounts of oxygen may prove beneficial. Suitable gases include any inert gas such as nitrogen, helium, or argon. Because of its availability, both as to cost and quantity, we prefer to use nitrogen.

The temperature at which the reaction may be carried out varies from about 20 to 70° C. A more limited temperature range is preferred; namely, 50 to 60° C.

The lower temperature limit of 20° C. is established by the fact that the reaction rate below 20° C. is very slow. Obviously, if time were not an important consideration, temperatures below 20° C. may be used. If, on the other hand, the temperature is allowed to exceed 70° C., the alkali metal alkyl compound formed during the reaction and perhaps some of the other compounds used in the reaction may be decomposed. When a temperature range varying from 20 to 70° C. is used, the reaction time varies correspondingly from 3 hours to ½ hour.

In order to disclose the nature of the present invention still more clearly, the following illustrative examples will be given. It is to be understood that the invention is not to be limited to the specific conditions or details set forth in these examples, except so far as such limitations are specified in the appended claims. Parts used are parts by weight.

*Example 1*

To a reaction vessel equipped with a stirrer and means for determining the temperature of the contents was added a dispersion consisting of 4.6 parts of sodium, 12 parts titanium trichloride, and 113 parts of dry hexane. A solution consisting of 14.87 parts of octyl chloride in 66 parts of hexane was then added to the reaction vessel over a period of one hour, during which time the temperature was maintained at about 50° C. During the entire reaction period the mixture was maintained under an atmosphere of dry nitrogen.

Upon the completion of the addition of the octyl chloride solution, the reaction mixture was divided into two equal parts. One of these fractions was then added to 196 parts of hexane and placed in a pressure vessel. Propylene at a pressure of 40 p.s.i.g. was added to the reaction vessel over a period of 1½ hours. At the end of the reaction time the contents of the reaction vessel were poured into methyl alcohol and the polymer removed by filtration. 16 parts of the polymer were recovered.

The polymer prepared by the method described above was compared to a typical sample of polypropylene produced by an aluminum triethyl-titanium trichloride catalyst. The results are summarized in the table below.

| Catalyst | M.P. polymer ° C. | Percent removed by ether extraction |
|---|---|---|
| RNa-TiCl$_3$ | 165-170 | 12.5 |
| Al(Et)$_3$-TiCl$_3$ | 168-171 | 10.9 |

NOTE.—References: G. Natta, et al., Agnew Chem 69, 213, 655 (1957). G. Natta, Chemistry and Industry 1525 (1957).

*Example 2*

The other half of the catalyst prepared in Example 1 above was added to 196 parts of hexane in a pressure vessel. The contents were then subjected to a pressure of 40 p.s.i.g. for 36 hours of ethylene gas. At the conclusion of that period the contents were poured into methyl alcohol and the polymer removed by filtration. The polymer recovered had a tensile strength of 4,705 and a density of .95.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for preparing a catalyst suitable for use in the catalytic polymerization of unsaturated hydrocarbons which comprises dispersing an alkali metal having an atomic number of not less than 11 and not more than 19 and a solid crystalline transition metal chloride wherein said metal is selected from the group consisting of titanium, chromium, vanadium, and tungsten in a normally liquid alkane, adding to the resulting dispersion a solution of a chlorine substituted hydrocarbon wherein the hydrocarbon group is selected from the group consisting of alkyl radicals containing from 4 to 10 carbon atoms in a normally liquid alkane and then heating the reaction mixture to between 20 and 70° C. for ½ to 3 hours characterized further in that the entire process is carried out under anhydrous conditions and under an atmosphere of an inert gas.

2. A process for preparing a catalyst suitable for use in the catalytic polymerization of unsaturated hydrocarbons which comprises dispersing an alkali metal having an atomic number of not less than 11 and not more than 19 and a solid crystalline transition metal chloride wherein said metal is selected from the group consisting of titanium, chromium, vanadium, and tungsten in a normally liquid alkane, adding to the resulting dispersion a solution of a chlorine substituted hydrocarbon wherein the hydrocarbon group is selected from the group consisting of alkyl radicals containing from 4 to 10 carbon atoms in a normally liquid alkane and then heating the reaction mixture to between 50 and 60° C. for ½ to 3 hours characterized further in that the entire process is carried out under anhydrous conditions and under an atmosphere of an inert gas.

3. The process of claim 2 wherein the transition metal chloride is titanium trichloride.

4. The process of claim 2 wherein the alkali metal is sodium.

5. The process of claim 2 wherein the alkali metal is potassium.

6. The process of claim 2 wherein the inert gas is nitrogen.

7. The process of claim 2 wherein the chlorine substituted hydrocarbon is octyl chloride.

References Cited in the file of this patent

UNITED STATES PATENTS

| | | |
|---|---|---|
| 2,488,736 | Palmer | Nov. 22, 1949 |
| 2,521,431 | Walsh | Sept. 5, 1950 |
| 2,839,518 | Brebner | June 17, 1958 |
| 2,879,263 | Anderson et al. | Mar. 24, 1959 |
| 2,881,156 | Pilar et al. | Apr. 7, 1959 |